United States Patent [19]

Hancou

[11] 4,279,054
[45] Jul. 21, 1981

[54] SCREEN-WIPER BLADE WITH REPLACEABLE BLADE RUBBER

[75] Inventor: Théodore Hancou, Geneva, Switzerland

[73] Assignee: Societe d'Exploitation de Brevets J.B., Fribourg, Switzerland

[21] Appl. No.: 40,791

[22] Filed: May 21, 1979

[30] Foreign Application Priority Data

Jun. 2, 1978 [CH] Switzerland .................. 6058/78

[51] Int. Cl.³ .............................................. B60S 1/38
[52] U.S. Cl. ................................................. 15/250.42
[58] Field of Search ............ 15/250.32, 250.36, 250.42

[56] References Cited

U.S. PATENT DOCUMENTS

| | | | |
|---|---|---|---|
| 2,697,241 | 12/1954 | Oishei | 15/250.42 |
| 2,925,615 | 2/1960 | Krohm | 15/250.42 |
| 3,114,926 | 12/1963 | Deibel | 15/250.42 |

FOREIGN PATENT DOCUMENTS

| | | | |
|---|---|---|---|
| 1446657 | 6/1966 | France | 15/250.42 |
| 1444215 | 7/1966 | United Kingdom | 15/250.42 |

Primary Examiner—Edward L. Roberts
Attorney, Agent, or Firm—James C. Wray

[57] ABSTRACT

A screen wiper blade with a replaceable rubber-blade comprises a deformable harness equipped with pairs of claws receiving the edges of a flexible vertebra on which a wiping blade rubber is mounted. The vertebra is constituted by an elongated thin metallic plate having a longitudinal slot over the major part of its length. The rubber blade is provided with a longitudinal bead turned towards the harness and separated from the body by a thin wall lodged in the said slot. Adjacent one of the extremities of the rubber blade and on the same side of the body as the bead is a nipple. The thin plate comprises at one extremity a cutaway portion forming a fork and the said nipple comprises in its lower part a groove facing the extremity of the blade rubber opposite to the said nipple, the said fork cooperating with the said groove. Thus the fitting of the blade rubber upon its thin plate is easier and the retention of the nipple is ensured by the cooperation of the fork with the groove in the nipple, which diminishes the risk of accidental falling apart.

9 Claims, 14 Drawing Figures

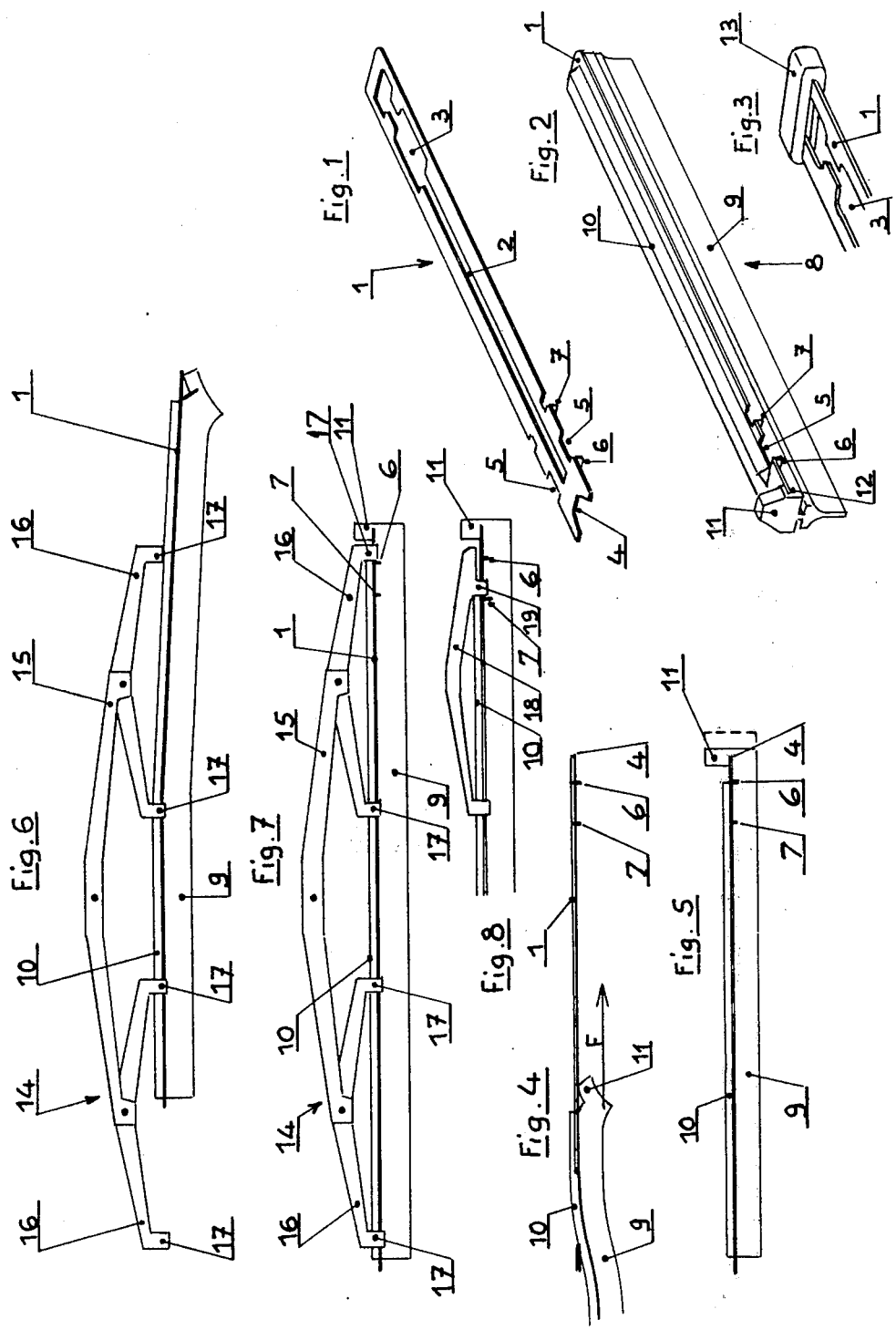

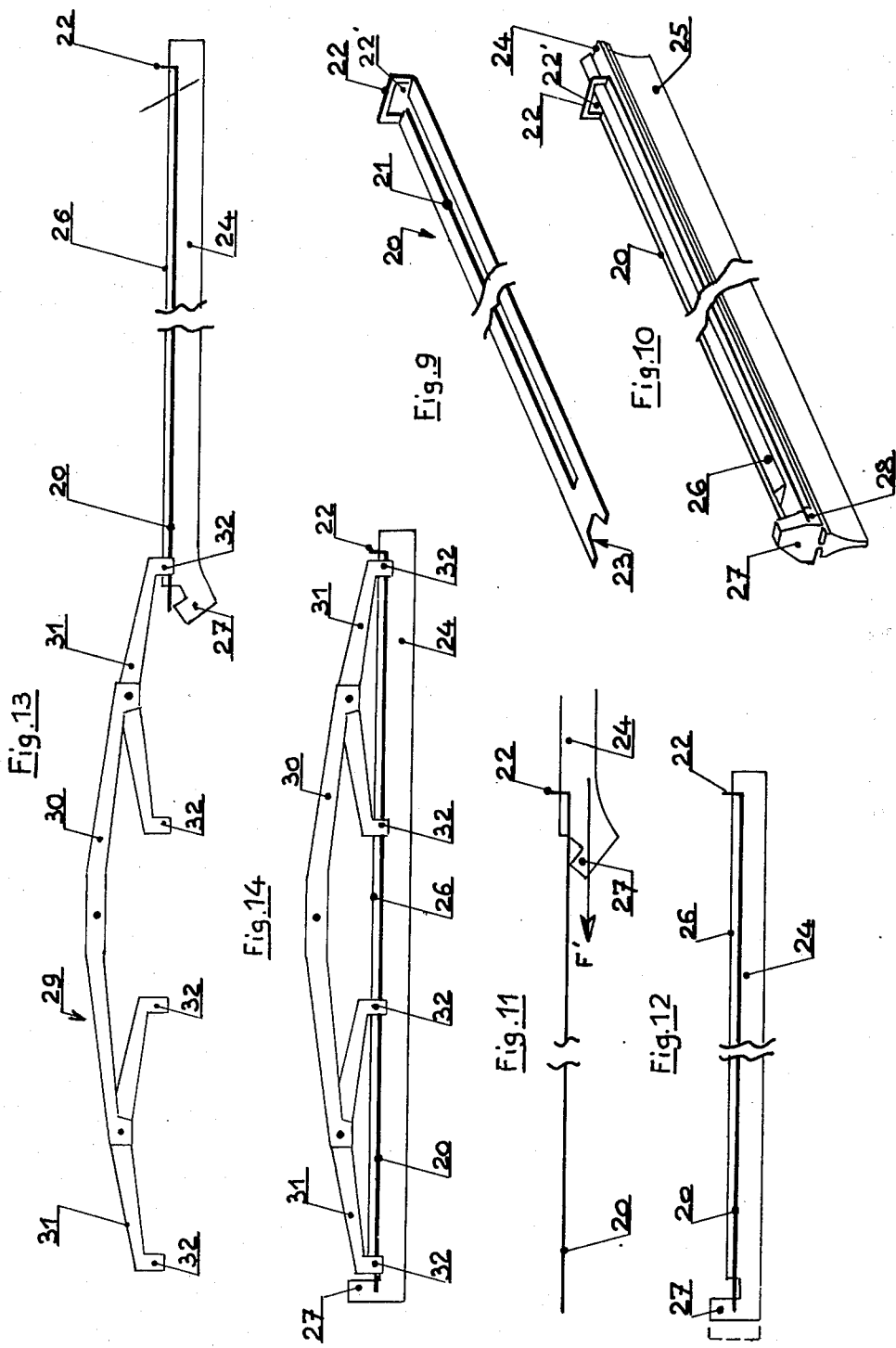

ସ୍କ୍ରୀ4,279,054

SCREEN-WIPER BLADE WITH REPLACEABLE BLADE RUBBER

BACKGROUND TO THE INVENTION

The present invention relates to screen-wiper blades with replaceable blade rubbers.

STATEMENT OF PRIOR ART

Screen-wiper blades with replaceable blade rubbers comprising a deformable harness equipped with pairs of claws receiving the edges of a flexible vertebra on which a wiping blade rubber is mounted are known, the said vertebra being constituted by an elongated thin metallic plate having a longitudinal slot over the major part of its length, the wiping blade rubber being equipped with a longitudinal bead turned towards the harness and separated from the body by a thin wall lodged in the said slot, also a nipple adjacent to one of the extremities of the blade rubber and situated on the same side of the body as the bead.

OBJECT OF THE INVENTION

The invention aims at simplifying the manufacture and fitting of such wiper blades.

SUMMARY OF THE INVENTION

According to the invention this is achieved by virtue of a screen-wiper blade of the above type which is characterised in that the said thin plate comprises at one extremity a cutaway portion forming a fork and the said nipple comprises in its lower part a groove facing the extremity of the blade rubber opposite to the said nipple, the said fork cooperating with the said groove.

Thus the fitting of the blade rubber upon its thin plate is easier and the retention of the nipple is ensured by the cooperation of the fork with the groove in the nipple, which diminishes the risk of accidental falling apart.

BRIEF DESCRIPTION OF DRAWINGS

A screen-wiper blade of this kind is represented by way of non-limitative example in the accompanying drawings, wherein:

FIG. 1 is a perspective view of a thin metallic plate according to one form of embodiment of the invention, FIG. 2 is a perspective view of the thin metallic plate according to FIG. 1 and a wiper blade rubber fitted together, FIG. 3 is a perspective view of one extremity of the metallic plate according to FIG. 1 equipped with a protective end piece, FIG. 4 is a diagrammatic elevational view of a wiper blade rubber in the course of fitting on the thin metallic plate according to FIG. 1, FIG. 5 is a diagrammatic elevational view of the wiper blade rubber and the thin metallic plate according to FIG. 4 after assembly, FIG. 6 is a diagrammatic elevational view of the assembly of wiper blade rubber and thin metallic plate according to FIG. 5, in the course of fitting upon a harness, FIG. 7 is a diagrammatic elevational view of the harness according to FIG. 6, equipped with the assembly according to FIG. 5, after fitting, FIG. 8 is a diagrammatic elevational view of the extremity of a variant of a harness equipped with the assembly according to FIG. 5, FIG. 9 is a perspective view of a thin metallic plate for a variant of the invention, FIG. 10 is a perspective view of the thin metallic plate according to FIG. 9 and a wiper blade rubber, fitted together, FIG. 11 is a diagrammatic elevational view of a wiper blade rubber in the course of fitting upon the thin metallic plate according to FIG. 9, FIG. 12 is a diagrammatic elevational view of the wiper blade rubber and the thin metallic plate according to FIG. 11, after assembly, FIG. 13 is a diagrammatic elevational view of the assembly of wiper blade rubber and thin metallic plate according to FIG. 12, in the course of fitting on a harness, FIG. 14 is a diagrammatic elevational view of the wiper blade equipped with the assembly according to FIG. 12.

DESCRIPTION OF PREFERRED EMBODIMENT

The screen-wiper blade as represented in FIGS. 1 to 8 comprises a thin metallic plate 1 (FIG. 1) having a central longitudinal slot 2 and a widened window 3 at one extremity. At the other extremity the thin plate 1 comprises a cutaway portion forming a fork 4. The plate 1 is further equipped, in the vicinity of the fork 4, with two elongated lateral cutaway portions 5 terminating on the side of the fork 4 in a turned-over part 6 forming a stop. Two further stops 7 are formed by cutting away and bending of the lateral edge at a specific distance from the turned-over part 6.

The thin plate 1 is intended to receive a wiper blade rubber 8 (FIG. 2) of rubber comprising a wiper lip 9 surmounted by a longitudinal bead 10 attached to the wiper lip 9 by a thin wall. At one of the extremities of the blade rubber 8 the bead 10 is interrupted and the nipple 11 is formed at the edge of the adjacent extremity of the blade rubber 8. A groove 12 is formed at the base of the nipple 11 and has the same dimensions as the interior of the fork 4. A protective end piece 13 (FIG. 3) can be fitted on the extremity of the thin plate 1 adjacent to the aperture 3.

The fitting of the wiper blade rubber 8 upon the thin metallic plate 1 is represented in FIG. 4. With the nipple 11 depressed, the thin wall separating the bead 10 from the wiper lip 9 is threaded into the slot 2 of the thin plate 1, starting from the window 3, and is drawn in the direction of the arrow F until the nipple 11 slightly passes the fork 4.

Next the assembly thus preassembled is fitted upon a harness 14 (FIG. 6) comprising a primary yoke 15 at each extremity of which a secondary yoke 16 is pivotably mounted. The two extremities of each secondary yoke 16 comprise a pair of claws 17 protruding opposite to the yoke 15 and turned inwards. The edges of the thin metallic plate 1 are slipped between the pair of claws 17 until the claws 17 of the last secondary yoke 16 are lodged in the apertures 5 and are locked by the stops 7.

Then the nipple 11 is released and comes to occupy the position represented in dotted lines in FIG. 5. The thin metallic plate 1 being held, the wiper blade rubber is then pushed back in the direction opposite to the arrow F until the fork 4 abuts in the bottom of the groove 12. The assembly of thin plate 1 and blade rubber 8 is then immobilised in relation to the harness 14, with a slight play possible to permit deformation.

In the variant according to FIG. 8 to claws 18 of the secondary yoke 19 are spaced from the adjacent extremity of this secondary yoke and are arrested by the stops 6 of the thin plate 1.

The wiper blade as represented in FIGS. 9 to 14 comprises a thin metallic plate 20 (FIG. 9) having a central longitudinal slot 21 and bent at a right angle at one extremity to form a heel piece 22 equipped with a widened window 22'. At the other extremity the thin plate comprises a cutaway portion forming a fork 23.

The thin plate 20 is intended to receive a wiper blade rubber 24 of rubber (FIG. 10) identical with the blade rubber 8 and comprising a wiper lip 25 surmounted by a longitudinal bead 26 attached to the wiper lip 24 by a thin wall. At one of the extremities of the blade rubber 24 the bead 26 is interrupted and a nipple 27 is formed on the edge of the adjacent extremity of the blade rubber 24. A groove 28 facing the bead 26 is formed at the base of the nipple 27 and has the same dimensions as the interior of the fork 23.

The fitting of the wiper blade rubber 24 on the thin metallic plate 20 is represented in FIG. 11. The nipple 27 being depressed, the thin wall separating the bead 26 from the wiper lip 25 is threaded into the slot 21 of the thin plate 20, starting from the window 22', and drawn in the direction of the arrow F' until the nipple 27 slightly passes the fork 23.

Next the assembly thus preassembled is fitted on to a harness 29 (FIG. 13) comprising a primary yoke 30 on each extremity of which a secondary yoke 31 is pivotably mounted. The two extremities of each secondary yoke 31 comprise a pair of claws 32 protruding opposite to the yoke 30 and bent inwards. The edges of the thin metallic plate 20 are slipped between the pairs of claws 32 until the heel piece 22 comes to abut against the exterior extremity of the last secondary yoke 31.

Then the nipple 27 is released and comes to occupy the position represented in dotted lines in FIG. 12. The thin metallic plate 20 is held and then the wiper blade rubber is pushed back in the direction opposite to the arrow F' until the fork 23 abuts in the bottom of the groove 28. The assembly of blade rubber 24 and thin plate 20 is then immobilised in relation to the harness 29, with a slight play possible to permit deformation.

I claim:

1. A screen-wiper blade with replaceable blade rubber, comprising
   (a) a deformable harness,
   (b) pairs of claws on said harness,
   (c) a flexible vertebra gripped at the extremities by said claws,
   (d) a wiper blade rubber fitted on said vertebra, the said vertebra being constituted by an elongated thin metallic plate having a longitudinal slot over the major part of its length,
   (e) a longitudinal bead on said blade facing the harness,
   (f) a thin wall disposed in said slot and effecting separation of the bead from the effective blade edge, and
   (g) a nipple adjacent one of the extremities of the blade rubber and situated on the same side of the body as the bead, said thin plate having at one extremity a cutaway portion forming a fork and the said nipple is formed at its lower part with a groove facing the extremity of the blade rubber opposite to the said nipple, said fork cooperating with said groove.

2. A screen-wiper blade according to claim 1, wherein the said thin metallic plate is terminated by a widened window prolonging the said longitudinal slot.

3. A screen-wiper blade according to claim 2, wherein the terminal part equipped with the said widened window is bent substantially at a right angle away from the said bead of the wiper blade rubber.

4. A screen-wiper blade according to claim 1, wherein the said thin metallic plate comprises, in the vicinity of the said fork, at least one recess on one edge, terminated by a bent stop.

5. Flexible vertebra for screen-wiper blade with replaceable blade rubber, comprising a deformable harness equipped with pairs of claws receiving the said flexible vertebra, the said vertebra being constituted by an elongated thin metallic plate comprising a longitudinal slot over the major part of its length, the wiper blade rubber being equipped with a longitudinal bead turned towards the harness and separated from the body by a thin wall lodged in the said slot, and a nipple adjacent to one of the extremities of the blade rubber and situated on the same side of the body as the bead, a cutaway portion at one extremity of said slate forming a fork arranged to cooperate with a groove formed in the base of the said nipple.

6. Vertebra according to claim 5, wherein it is terminated by a widened window prolonging the said longitudinal slot.

7. Vertebra according to claim 6, wherein the terminal part equipped with the said widened window is bent substantially at a right angle away from the said bead of the wiper blade rubber.

8. Vertebra according to claim 5, wherein in the vicinity of the said fork there is provided at least one recess on an edge, terminated by a bent stop.

9. Wiper blade rubber for screen-wiper blade with replaceable blade rubber comprising a deformable harness equipped with pairs of claws receiving the edges of a flexible vertebra on which the said wiper blade rubber is fitted, the said vertebra being constituted by an elongated thin metallic plate comprising a longitudinal slot over the major part of its length, the wiper blade rubber being equipped with a longitudinal bead turned towards the harness and separated from the body by a thin wall lodged in the said slot, and a nipple adjacent to one of the extremities of the blade rubber and situated on the same side of the body as the bead, said nipple having at its lower part a groove facing the extremity of the blade rubber opposite to the said nipple. which groove receives and locates one end of said metallic plate.

* * * * *